Figure 1:
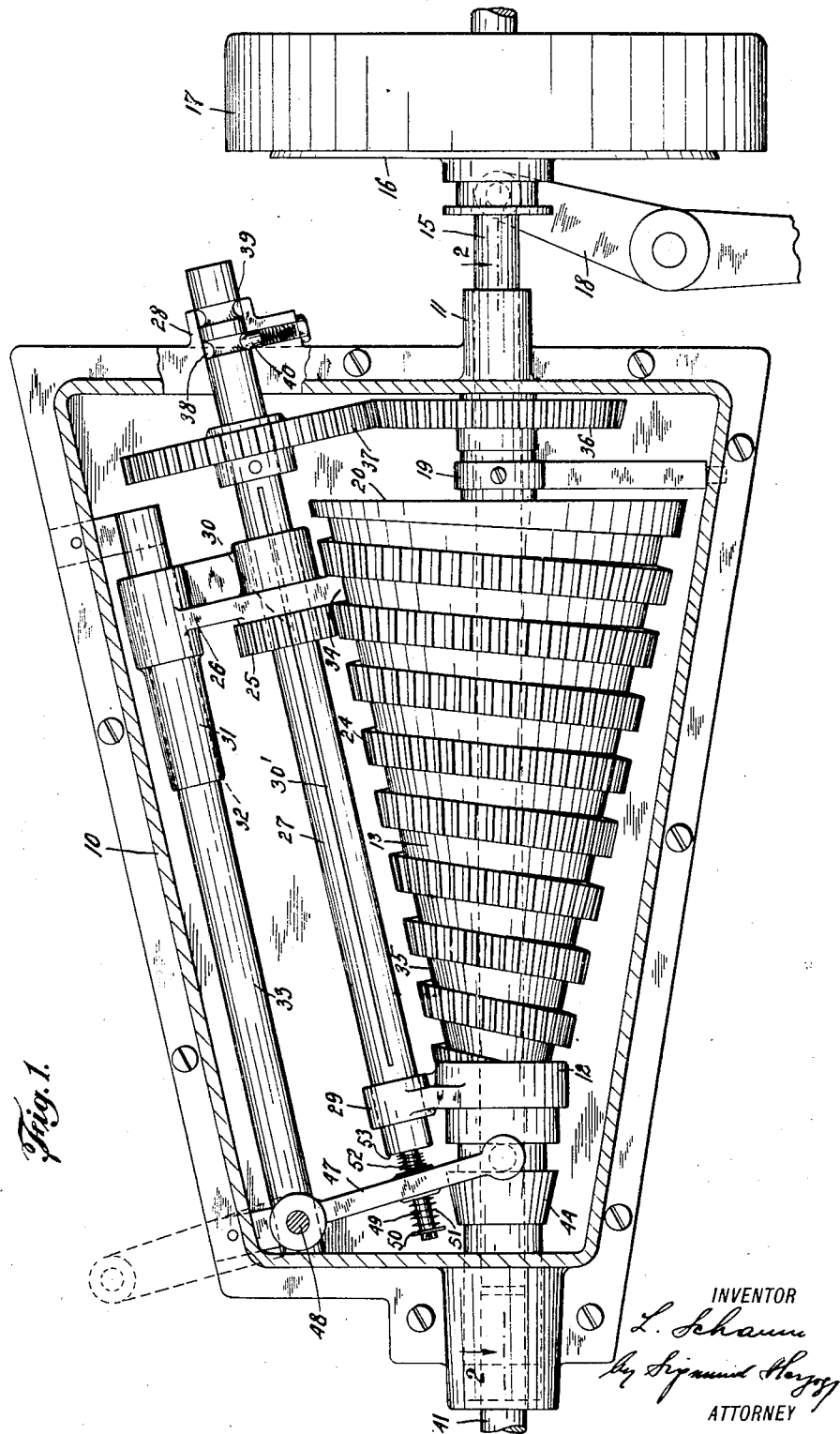

Mar. 3, 1925. 1,528,574

L. SCHAUM

VARIABLE SPEED TRANSMISSION MECHANISM

Filed July 3, 1924 2 Sheets-Sheet 1

INVENTOR
L. Schaum
By Sigmund Herzog
ATTORNEY

Mar. 3, 1925.
L. SCHAUM
VARIABLE SPEED TRANSMISSION MECHANISM
Filed July 3, 1924
1,528,574
2 Sheets-Sheet 2
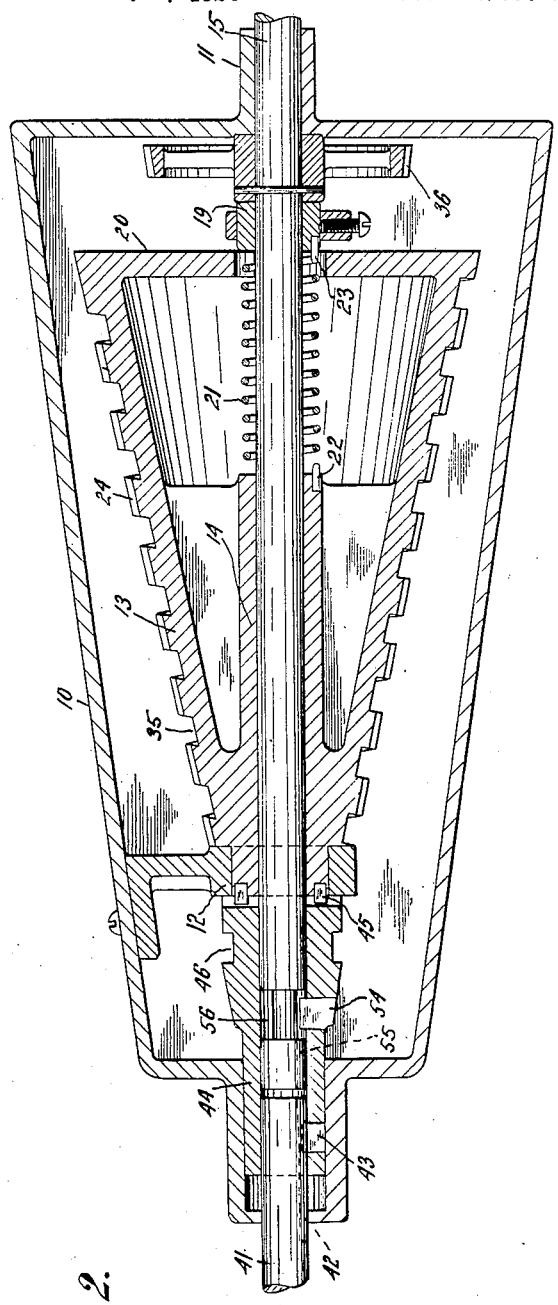

Patented Mar. 3, 1925.

1,528,574

UNITED STATES PATENT OFFICE.

LOUIS SCHAUM, OF KENSINGTON, NEW YORK.

VARIABLE-SPEED-TRANSMISSION MECHANISM.

Application filed July 3, 1924. Serial No. 724,092.

*To all whom it may concern:*

Be it known that I, LOUIS SCHAUM, a citizen of the United States, and resident of Kensington, in the county of Queens and State of New York, have invented certain new and useful Improvements in Variable-Speed-Transmission Mechanisms, of which the following is a specification.

The present invention relates to a power transmitting apparatus, and more particularly to a variable speed transmission especially designed for automobiles and power driven vehicles, but applicable to other devices just as well.
The main object of the invention is to provide a variable speed transmission mechanism, whereby a progressive continuous change of speed is automatically obtained from low speed to high speed.
Another object of the invention is to produce a speed changing mechanism of the type mentioned, in which the variable speed driving member is automatically thrown out of engagement when high speed is obtained and at the same time the driving shaft directly connected with the driven shaft.

A further object of the invention is to produce a variable speed transmission mechanism of the type referred to, whereby the speed changing elements of the mechanism are automatically returned to initial position when the driving shaft is directly connected with the driven shaft.
A still further object of the invention is to provide a mechanism of this class which is simple in construction, efficient in operation, durable and which will not readily deteriorate or get out of order.
With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 1 is a top plan view of the improved power transmission, partly in section; Fig. 2 is a section taken on line 2—2 of Fig. 1; and Fig. 3 is a top plan view of the clutch device of the transmission, its elements being shown in positions other than those shown in Fig. 1.

In the drawings, the numeral 10 indicates the casing or box of the change speed gear. On this casing is provided a bearing 11, in alignment with a bearing 12 within the said casing. In the latter bearing is rotatably mounted a hollow conical member 13, providing a bearing 14 for the driving shaft 15 of the transmission, said shaft being also mounted in the bearing 11 and carrying a clutch member 16, for co-operation with a clutch element on the fly-wheel 17 of an engine. A clutch operating lever 18 is provided for actuating the clutch member 16 in a manner well known in the art. The hollow cone 13 is adapted to rotate on the driving shaft, it being held against longitudinal movement thereon by the bearing 12 and by a stop 19, which bears against the base 20 of the cone, the said base being disposed adjacent the bearing 11. A spring 21 is coiled around the driving shaft within the cone 13, one end of said spring being attached at 22 to the said cone, and its other end at 23 to the stop 19. The purpose of this arrangement will be described hereinafter.

On the cone is provided a spiral gear 24, that is to say a gear having teeth arranged spirally or worm-fashion about the circumference of the cone from its base to the bearing 12. The diameter of the gear decreases thus progressively and continuously from the base of the cone to its apex. The teeth of this spiral gear are arranged parallel to the side of the cone, as clearly shown in Fig. 1 of the drawings and are adapted to mesh with a pinion 25, that is rotatable upon a carrier 26, the latter being slidably mounted upon a countershaft 27. This shaft extends parallel to the side of the cone (Fig. 1), and is rotatably mounted in bearings 28 and 29. The bearing 28 is formed on the casing 10, while the bearing 29 is mounted upon or made, preferably, integral with the bearing 12. The connection between the pinion 25 and shaft 27 is made by a key 30 upon the former, engaging a longitudinal keyway 30' in the shaft 27. The carrier 26 is provided with an extension 31 having a bore 32, through which extends a fixed guide 33, the said guide being attached in any suitable manner to the casing 10. The carrier is also provided with a nose 34, in engagement with a spiral groove 35 in the cone 13, the said groove being formed between the convolutions of the spiral gear on said cone.

To the driving shaft is fixed within the casing a gear 36, in mesh with a gear 37, which is secured to the countershaft 27. This countershaft is slidably arranged in its bearings, it being provided with two peripheral grooves 38 and 39, into which is adapted to project a spring-pressed lug 40, holding the countershaft in either one of its two positions hereinafter to be described.

The driven shaft 41 of the change speed gear is mounted in alignment with the driving shaft, it being provided with a keyway 42, in which is seated a key 43 upon a clutch member 44, co-operating with clutch elements 45 on the cone 13. The clutch member 44 is shiftable on the driven shaft for the purpose of engaging it with and disengaging the same from the clutch elements 45. For this purpose, the clutch member 44 is provided with a peripheral groove 46, with which is engaged a clutch shifter 47, that is fulcrumed at 48 to the casing 10. Through the clutch shifting member 47 is extended the reduced portion 49 of the countershaft 27. On the outer end of this reduced portion is provided a disk 50, a spring 51 being interposed between the said disk and the clutch shifter 47. A spring 52 is interposed between the said clutch shifter and a shoulder 53 on the countershaft 27.

The driving shaft extends into the clutch member 44, the latter being provided with a key 54, adapted to be seated in a keyway 55 in the driving shaft. This driving shaft is also provided with a peripheral groove 56, into which the key 54 reaches when the clutch member 44 is in engagement with the clutch elements 45 on the cone 13 (Fig. 2). When the elements are in the last-mentioned positions, the clutch member 44 rotates with the cone 13, but the driving shaft is disengaged from the driven shaft.

The extension 31 on the pinion carrier 26 is of a length that it is brought to bear against the clutch shifting element 47 when the pinion 25 is about to reach that end of the spiral gear 24 which is disposed near the apex of the cone 13, it actuating the clutch shifter 47 so as to disengage the clutch member 44 from the clutch elements 45 when the pinion 25 is about to bear against the bearing 29.

The operation of this device is as follows: When the clutch member 16 is in engagement with the fly-wheel 17 and the gears 36 and 37 are in mesh, the rotation of the crank shaft of the engine is transmitted to the countershaft 27 and by the latter to the pinion 25. This pinion is continuously in mesh with the spiral gear 24 on the cone 13 and it is obvious that, when the pinion is disposed near the base of the cone, the latter will be rotated at low speed. The rotation of the cone is transmitted to the driven shaft 41 by the interengaging clutch elements on the said cone and driven shaft. As the cone rotates, the carrier 26 is caused to move longitudinally on the countershaft 27 toward the apex of the cone, carrying with it the pinion 25. In this manner the speed of the cone and, consequently, of the driven shaft of the transmission is progressively and continuously increased. When the extension on the pinion carrier reaches the clutch shifter 47, it disengages, in the further movement of the gear carrier, the clutch member 44 from the clutch elements 45 and simultaneously seats the key 54 in the keyway 55 in the driving shaft, thereby directly connecting the latter with the driven shaft. When the clutch shifter 47 is being moved in the manner stated, the spring 51 is compressed, causing the countershaft to move longitudinally and thus to disengage the gear 37 from the gear 36. The countershaft 27 is held in this position by the lug 40 being seated in the peripheral groove 39 in the countershaft.

While the cone is revolving on the driving shaft 15, the spring 21 is wound up. As soon as the gear 37 is disengaged from the gear 36, the spring causes the cone to revolve in a direction opposite to that in which it moved while the pinion 25 traveled from the base of the cone to its apex. The cone, moving under the action of the spring 21, causes the carrier 26 and the pinion 25 to move adjacent the base of the cone, or in other words into position ready to drive at low speed.

In order to change from high speed to low speed, the shifter 47 is manually moved to engage the clutch member 44 with the clutch elements 45. When so moving the spring 52 is compressed, thereby shifting the countershaft 27 longitudinally to bring the gear 37 into mesh with the gear 36. It is obvious that when these gears are to be brought into mesh, the clutch member 16 must be disengaged from the fly-wheel. When thereafter the clutch member 16 is again engaged with the fly-wheel, the driving shaft is driven at low speed, its speed being automatically increased to high speed in the manner above described.

What I claim is:—

1. A speed change mechanism, including a driving shaft, a countershaft driven thereby, a cone rotatably arranged on said driving shaft, a spiral gear on said cone extending from adjacent its base to adjacent its apex, a gear carrier shiftable longitudinally on said countershaft, a pinion on said carrier in mesh with said spiral gear, and coacting means on said cone and carrier for causing the latter to move longitudinally upon said countershaft in the rotation of said cone.

2. A change speed mechanism according to claim 1, comprising a driven shaft, and a clutch mechanism connecting said driven shaft with said cone.

3. A change speed mechanism, including a driving shaft, a countershaft driven thereby, a cone rotatably arranged on said driving shaft, a spiral gear on said cone extending from adjacent its base to adjacent its apex, a gear carrier shiftable longitudinally on said countershaft, a pinion on said carrier in mesh with said spiral gear, said cone being provided with a spiral groove between the convolutions of said spiral gear, and a nose on said carrier extending into said groove, whereby upon rotation of said cone said carrier is caused to move longitudinally upon said countershaft.

4. A speed change mechanism, including a driving shaft, a countershaft driven thereby, a cone rotatably arranged on said driving shaft, a spiral gear on said cone extending from adjacent its base to adjacent its apex, a gear carrier shiftable longitudinally on said countershaft, a pinion on said carrier in mesh with said spiral gear, coacting means on said cone and carrier for causing the latter to move longitudinally upon said countershaft in the rotation of said cone, a driven shaft, and a clutch mechanism between said cone and said driven shaft, said mechanism including means for connecting said driven shaft to said driving shaft when said cone is freed from said driven shaft.

5. A change speed mechanism according to claim 4, comprising means for actuating said clutch mechanism, and means on said carrier co-operating with said clutch actuating mechanism for disconnecting said cone from said driven shaft and connecting said driving shaft to said driven shaft when said cone has reached its highest speed.

6. A change speed mechanism according to claim 4, comprising means for actuating said clutch mechanism, and means on said carrier co-operating with said clutch actuating mechansm for disconnecting said cone from said driven shaft and connecting said driving shaft to said driven shaft when said cone has reached its highest speed and for simultaneously disconnecting said countershaft from said driving shaft.

7. A speed change mechanism, including a driving shaft, a countershaft driven thereby, a cone rotatably arranged on said driving shaft, a spiral gear on said cone extending from adjacent its base to adjacent its apex, a gear carrier shiftable longitudinally on said countershaft, a pinion on said carrier in mesh with said spiral gear, coacting means on said cone and carrier for causing the latter to move longitudinally upon said countershaft in the rotation of said cone, a driven shaft, a clutch mechanism between said cone and said driven shaft, said mechanism including means for connecting said driven shaft to said driving shaft when said cone is freed from said driven shaft, and means for automatically moving said carrier and the pinion thereon toward the base of said cone when the latter is freed from said driven shaft.

8. A speed change mechanism, including a driving shaft, a countershaft driven thereby, a cone rotatably arranged on said driving shaft, a spiral gear on said cone extending from adjacent its base to adjacent its apex, a gear carrier shiftable longitudinally on said countershaft, a pinion on said carrier in mesh with said spiral gear, coacting means on said cone and carrier for causing the latter to move longitudinally upon said countershaft in the rotation of said cone, a clutch mechanism between said cone and said driven shaft, and means for automatically freeing said cone from said driven shaft when said cone has reached its highest speed and simultaneously connecting said driven shaft to said driving shaft.

Signed at New York, in the county of New York, and State of New York, this 19th day of May, A. D. 1924.

LOUIS SCHAUM.